United States Patent [19]

Klauck et al.

[11] 4,250,502

[45] Feb. 10, 1981

[54] RESOLUTION FOR A RASTER DISPLAY

[75] Inventors: Bernd Klauck, Buchenhain; Michael Wolff, Benediktbeuern, both of Fed. Rep. of Germany

[73] Assignee: Siemens Aktiengesellschaft, Berlin & Munich, Fed. Rep. of Germany

[21] Appl. No.: 29,830

[22] Filed: Apr. 13, 1979

[30] Foreign Application Priority Data

May 2, 1978 [DE] Fed. Rep. of Germany ....... 2819286

[51] Int. Cl.[3] ................................ G06F 3/14

[52] U.S. Cl. .............................. 340/728; 340/745; 340/750; 340/800

[58] Field of Search ................ 340/728, 747, 711, 745

[56] References Cited

U.S. PATENT DOCUMENTS

| | | | |
|---|---|---|---|
| 3,750,135 | 7/1973 | Carey et al. | 340/711 X |
| 3,821,730 | 6/1974 | Carey et al. | 340/711 X |
| 4,052,719 | 10/1977 | Hutt et al. | 340/728 X |

*Primary Examiner*—David L. Trafton

*Attorney, Agent, or Firm*—Hill, Van Santen, Steadman, Chiara & Simpson

[57] ABSTRACT

A circuit and method for displaying characters in a point matrix on a video screen raster with improved resolution utilizes first and second character generators each storing a portion of the character points to be displayed. Each character generator provides an input to an associated shift register, and the shift registers are controlled by complementary clock pulses so that the outputs are shifted by one-half of a bit representing a character point in the matrix. The outputs of the shift registers are combined in a mixer to provide a single output having twice the resolution power of conventional units but without increased band width.

7 Claims, 7 Drawing Figures

RESOLUTION FOR A RASTER DISPLAY

BACKGROUND OF THE INVENTION

1. Field of the Invention

The present invention relates to a circuit for displaying characters on a video raster in the form of discrete character images.

2. Description of the Prior Art

Video data display units utilizing a cathode-ray tube to produce images on a raster screen in the form of discrete blocks are known in the art. Such devices utilize a portion of the screen for display which is divided into fields arranged in lines and columns. Character images are produced by directing an electron beam at discrete portions of the field designated by line and column positions. Only such designated areas are illuminated, resulting in an image on the screen corresponding to a designated character.

The information associated with each character controlling which portions of the raster are to be illuminated is stored in a character generator in the form of a point matrix. Each point of the point matrix in the character generator corresponds with a character point or block of the character to be displayed, said blocks or points occupying a discrete area of the raster. The information associated with each character is taken line by line from the character generator and displayed on the raster.

The graphic quality of the displayed character is dependent upon size of the discrete points and upon the number of individual points per character. Increased resolution and refinement in the shape of the character displayed can be achieved by decreasing the size of the discrete points, however, a correspondingly increased band width is required to transmit such a character line in order to accommodate the increased information bits.

SUMMARY OF THE INVENTION

In accordance with the principles of the present invention a device for the display for characters on video screens having a raster utilizes two conventional character generators and associated shift registers to provide a character image having doubled resolution without an increase in the information band width.

The invention utilizes a mixer circuit comprised of a first shift register triggered by a first trigger pulse and connected to a first character generator, and a second shift register which is triggered by a second trigger pulse and is connected to the second character generator. The second trigger pulse is 180° out of phase with the first trigger pulse so that the outputs of the shift register overlap by one-half of a bit length. The outputs are combined by an OR gate.

It is thus an object of the present invention to provide an circuit arrangement for video data display equipment utilizing a raster display screen which provides improved character display character display quality without decreasing the width of the discrete points which make up the individual characters and to thus increase the number of character points per display line by overlapping display points without increasing the band width of the device.

DESCRIPTION OF THE PREFERRED EMBODIMENTS

Figure 1:
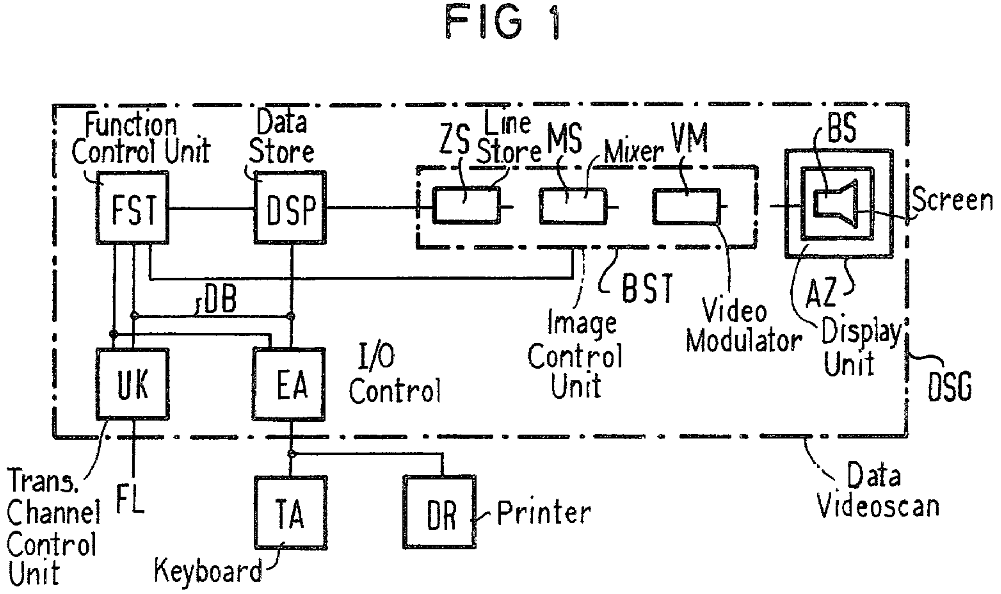
FIG. 1 shows a block diagram of a video data display system constructed in accordance with the principles of the present invention.

A video data display system DSG is shown in FIG. 1 for the display of characters on a raster screen. The system DSG contains a display unit AZ for displaying characters on a screen BS controlled by conventional deflection amplifiers and luminosity controls. The system DSG also contains an image control unit BST comprised of a line store ZS, a mixer MS, and a video modulator VM. The mixer MS will be more fully described in detail below.

The image control unit BST calls data words assigned to characters to be displayed in a periodic sequence from a data store DSP via a channel with direct store access, for producing the character points in combination to form the desired image on the screen BS. The data store DSP may thus be a random access memory, and is connected to a function control unit FST which controls the chronological sequence of a display of characters on the screen BS via a data bus DB through which the data words may be transmitted in both directions.

The data store DSP is also connected to a transmission channel control unit UK and also with an input-/output control unit EA. The transmission channel control unit UK connects the system DSG to different transmission means, for example, a long distance line FL which may be utilized to transmit to an exchange equipped with a data processing device.

Any suitable input or output apparatus such as, for example, a keyboard TA or a printer DR may be connected to the input/output control unit EA. The system DSG may be utilized with any suitable data transmission means, and need not be limited to those shown in FIG. 1.

Figure 2:
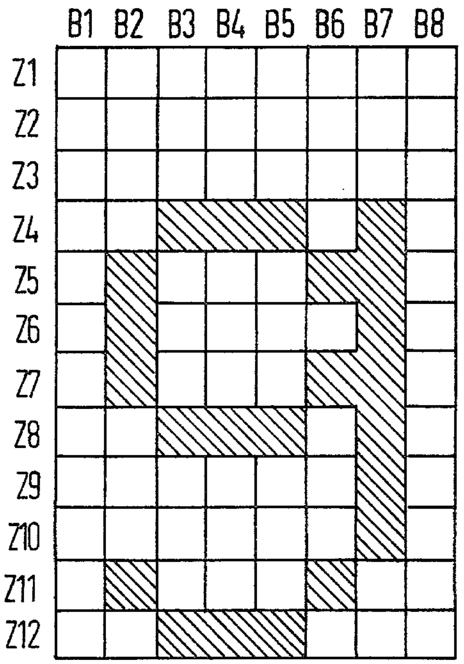
FIG. 2 shows an enlarged schematic illustration of a conventional raster matrix display of the letter "g".

A character to be displayed on the screen BS is stored in the image control unit BST in character generators in the form of a point matrix. Such a point matrix as may be found in conventional display devices is shown in FIG. 2 for use with an $8\times 12$ bit raster. The matrix of FIG. 2 is comprised of eight columns B1 through B8 and twelve lines Z1 through Z12. The portions of the matrixes in FIG. 2 on which an electron beam is incident are designated by slashes. The character displayed in FIG. 2 is the letter "g".

Figure 3:
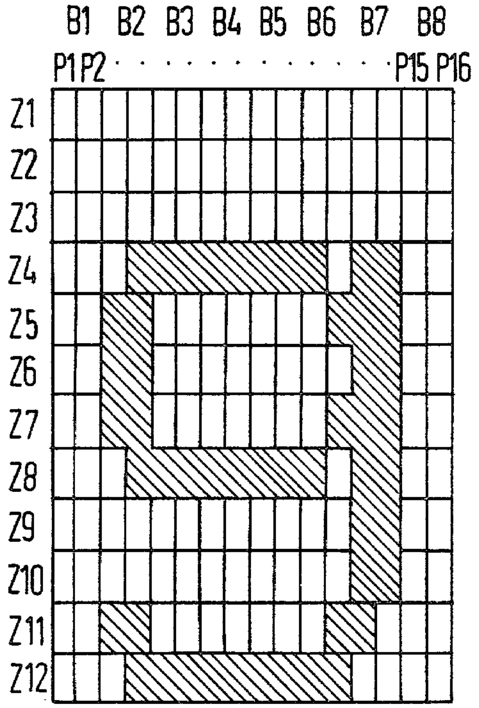
FIG. 3 shows an enlarged schematic illustration of an improved raster matrix display of the letter "g" achieved with the present invention.
Figure 5:
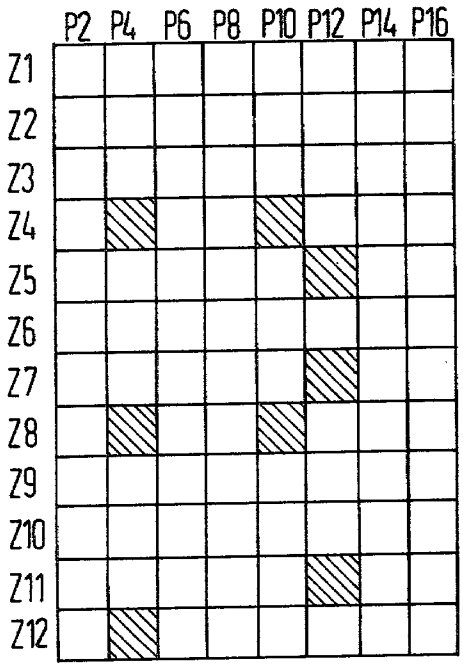
Figure 6:
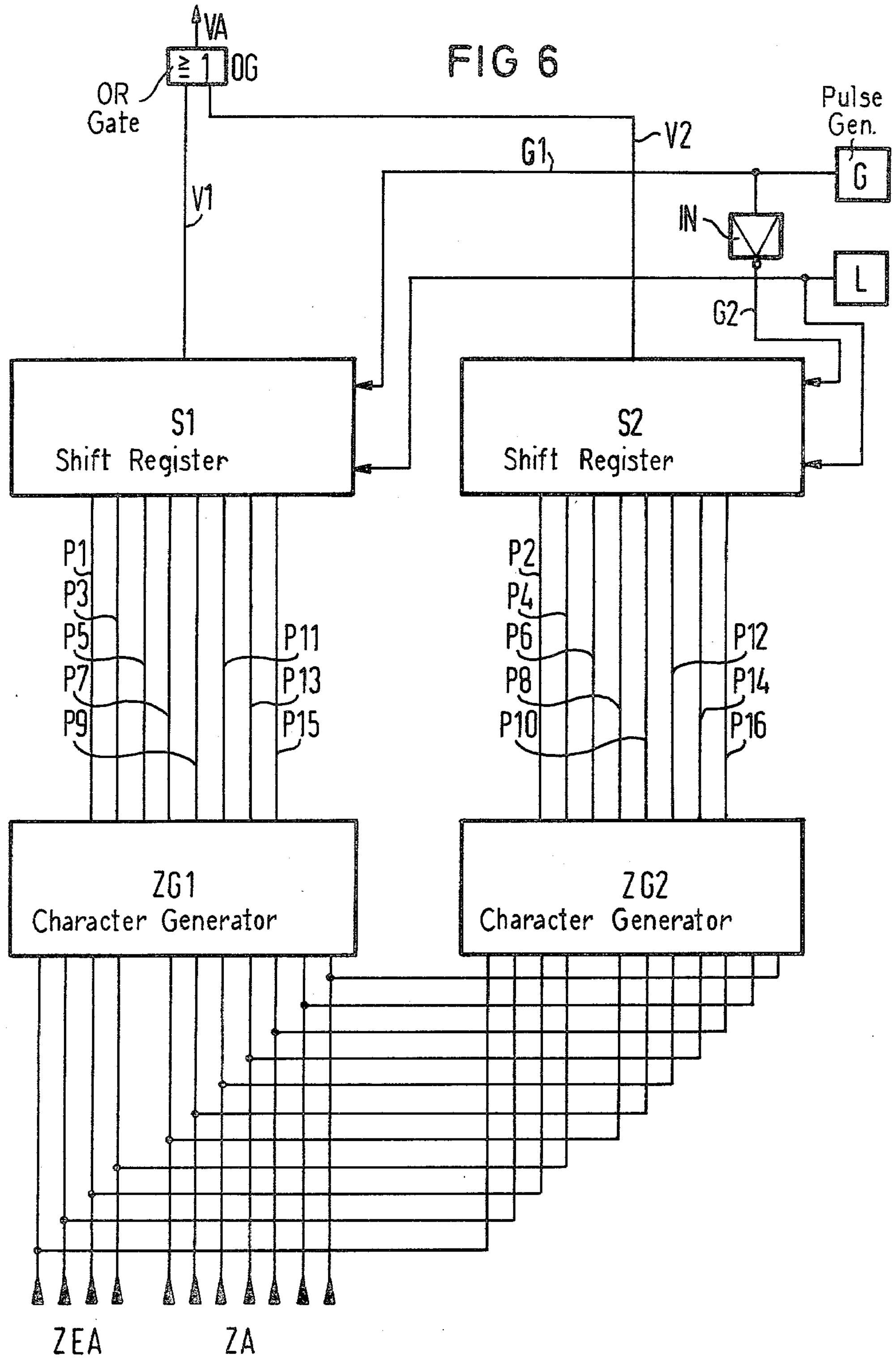
FIG. 6 is a detailed block diagram of the mixer of FIG. 1.

By comparison, a display output of a device utilizing the mixer circuit of FIG. 6 is shown in FIG. 3. Again, the letter "g" is displayed, however the improved resolution attained in FIG. 3 is readily apparent. The matrix shown in FIG. 3 appears as a 16×12 bit matrix, however, it will be apparent that such an output results from the combination of the matrices of FIGS. 4 and 5, and a matrix having 16 divisions does not in reality exist in the associated memories. The schematic matrixes of FIG. 3 has columns P1 through P16 and lines Z1 through Z12. Each of the eight pairs of columns comprising the columns P1 through P16 corresponds to one of the columns B1 through B8 in FIG. 2.

Figure 4:
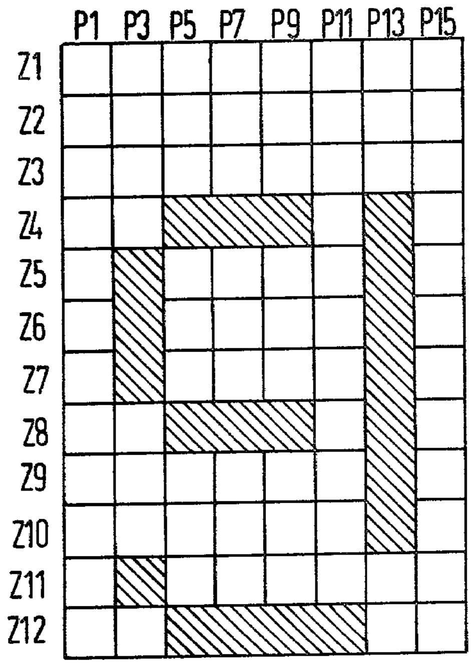
FIGS. 4 and 5 are schematic illustrations of two raster matrix displays which are combined in accordance with principles of the present invention to achieve the display of FIG. 3.

Two matrices to be combined to produce the matrix shown in FIG. 3 are illustrated in FIGS. 4 and 5. FIG. 4 represents a matrix having the odd numbered columns of FIG. 3, P1 through P15, and lines Z1 through Z12. The matrix of FIG. 5 contains the even numbered columns P2 through P16 of FIG. 3, and also has lines Z1 through Z12. When the two matrices shown in FIGS. 4 and 5 are combined in the manner explained in connection with FIG. 6, the character of FIG. 3 having improved resolution is produced.

A more detailed block diagram of the mixer MS of FIG. 1 is shown in FIG. 6. The circuit of FIG. 6 has a first character generator ZG1 and a second character generator ZG2. Information is entered into each of the character generators by four address lines ZEA, for selecting a maximum of 16 lines of one point matrix, and via the address lines ZA, for selecting 128 possible characters.

Figure 7:
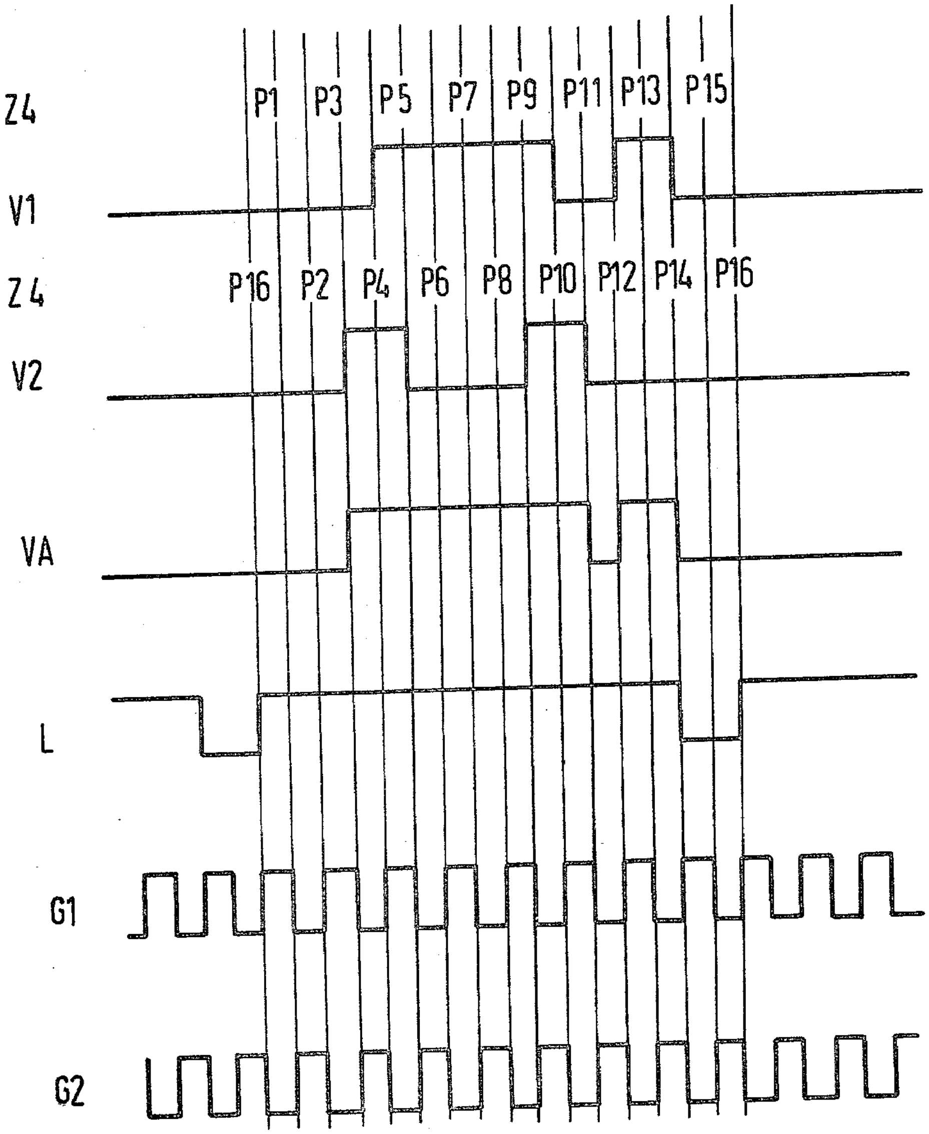
FIG. 7 graphically illustrates a series of voltages associated with the output of the images illustrated in FIGS. 4 and 5.

The 8-bit-parallel information of the character generator ZG1, associated with the odd-numbered columns P1 through P15 of the matrix, is transformed into a series signal V1 in a shift register S1. Similarly, the 8-bit-parallel information of the character generator ZG2, representing the even numbered columns P2 through P16 of the matrix, is transformed in a series signal V2 in an second shift register S2. Each of the shift registers S1 and S2 is controlled by a clock pulse generator G and a load pulse generator L, whose outputs are shown in FIG. 7. The clock pulse generator G output is inverted by an inverter IN for use with the shift register S2, so that the respective clock pulse inputs G1 and G2 of the shift registers S1 and S2 are out of phase by 180°.

The output V1 and V2 of the shift registers S1 and S2 are combined in an OR gate OG to produce a combined output VA. Because of the 180° shift associated with the clock pulse G2, the output VA will be an "overlapping" of the matrices of FIGS. 4 and 5, as shown in FIG. 3.

FIG. 7 shows a graph of various voltages associated with the generation of line Z4 of the matrix of FIG. 3. The line V4A represents the odd numbered columns of FIG. 4, and the line Z4B represents the even numbered columns of FIG. 5. The respective shift register outputs associated with each, V1 and V2, are respectively shown below each line. The total output VA, which is the combination of V1 and V2, is shown immediately below that. The load pulse L is shown, representing the period during which parallel information loading can occur. Finally, the two clock pulses G1 and G2, respectively associated with the shift registers S1 and S2, and which are 180° out of phase, are shown at the bottom of FIG. 7.

Although various changes and modifications may be suggested by those skilled in the art, it is the intention of the inventors to embody within the patent warranted hereon all such changes and modifications as reasonably and properly come within the scope of their contribution to the art.

We claim as our invention:

1. A mixer circuit for use in producing a display matrix having discrete points arranged to form a character on a raster screen in a video display device comprising:

a plurality of character generators for respectively producing identically dimensioned component matrix lines each containing a group of selectively positioned raster points, each group constituting a portion of a total coded output associated with a display matrix line of a character to be displayed in response to a coded input;

a plurality of shift registers each respectively connected to a character generator for producing a pulsed voltage output corresponding to information received from respectively connected character generators;

a clock pulse generator and a load pulse generator connected to each shift register for control thereof such that all but one shift register pulsed voltage outputs are shifted by a fraction of a point width with respect to said one of said outputs; and an OR gate connected to outputs of each shift register for combining said outputs into a signal representing a line of said matrix for display on said screen.

2. The mixer circuit of claim 1 wherein said display matrix has a plurality of consecutively numbered columns and a first character generator produces a component matrix line output representing odd numbered columns of a display matrix line and a second character generator produces a component matrix line output representing even numbered columns of the same display matrix line.

3. The mixer circuit of claim 2 wherein a single clock pulse generator controls shift registers respectively connected to said first and second character generators, and an inverter is inconnected between said clock pulse generator and one of said shift registers.

4. The mixer circuit of claim 1 wherein said individual shift register outputs are shifted by one-half of a point width with respect to one of said outputs.

5. A method for producing a display matrix having discrete points arranged for form a character on a raster screen in a video display device comprising the steps of:

generating a plurality of component matrix lines of coded information associated with a character to be displayed in a display matrix line;

transforming said coded information into a pulsed voltage output for each said component matrix line;

shifting all but one said voltage outputs a fraction of a point width with respect to said one of said outputs; and combining said voltage outputs to form a display signal for said display matrix line.

6. The method of claim 5 wherein said matrix has a plurality of consecutively numbered columns, and the generating step is further defined by:

generating a component matrix line of coded information associated with a character to be displayed representing odd numbered columns of a matrix line, and generating a component matrix line of coded information associated with a character to be displayed representing even numbered columns of the same matrix line.

7. The method of claim 6 wherein the shifting step is further defined by shifting said voltage outputs one-half of a point width with respect to one of said outputs.

* * * * *